United States Patent [19]

Yajima et al.

[11] 4,397,544

[45] Aug. 9, 1983

[54] OPTICAL APPARATUS FOR CHANGING MAGNIFICATION OR REDUCTION RATES

[75] Inventors: Toshiyuki Yajima; Syuzo Kimura, both of Saitama, Japan

[73] Assignee: Fuji Photo Optical Co., Ltd., Saitama, Japan

[21] Appl. No.: 297,205

[22] Filed: Aug. 28, 1981

[30] Foreign Application Priority Data

Aug. 31, 1980 [JP]  Japan .......................... 55-123897[U]
Aug. 31, 1980 [JP]  Japan .......................... 55-123900[U]

[51] Int. Cl.³ ........................ G03B 27/36; G03B 27/38
[52] U.S. Cl. ..................................... 355/58; 350/255; 350/427; 350/429; 354/197
[58] Field of Search ............................ 354/195, 197; 355/55–59; 350/427, 429, 237, 255

[56] References Cited

U.S. PATENT DOCUMENTS

| | | | |
|---|---|---|---|
| 3,632,072 | 8/1972 | Hess et al. ....................... | 355/58 X |
| 3,850,507 | 11/1974 | Uesugi ............................ | 354/197 X |
| 4,048,641 | 9/1977 | Cieplik et al. ................... | 355/58 X |
| 4,083,057 | 4/1978 | Quinn .............................. | 354/195 X |
| 4,099,866 | 7/1978 | Jones et al. ..................... | 355/58 |

*Primary Examiner*—Richard A. Wintercorn
*Attorney, Agent, or Firm*—Young & Thompson

[57] ABSTRACT

A main lens carriage holding a main lens assembly is moved along the optical path by a cam cylinder. A supplemental lens element is operatively coupled with the main lens assembly at the proper position to attain the desired optical reduction ratio. When the main lens assembly deviates from the proper position, a main lens support frame is shifted along the optical path in and relative to the main lens carriage by a correcting mechanism so as to correct the deviation. A further supplemental lens element is provided, but does not move with the main lens assembly. Both supplemental lens elements swing into and out of the optical path under cam action; and further cam action is provided to ensure that the two swinging lens elements do not collide with each other. The main lens support frame is rapidly moved along the optical path by the cam action of a rotating cylinder having a cam groove having part-circular portions that define the desired dwell positions and having open ends.

11 Claims, 11 Drawing Figures

OPTICAL APPARATUS FOR CHANGING MAGNIFICATION OR REDUCTION RATES

BACKGROUND OF THE INVENTION

The present invention relates to an improved optical apparatus and in particular, to an improved optical apparatus including a main lens assembly and selectively usable supplemental corrective lenses pivotable into and out of the optical path for creating copies of originals of either the same size as the originals or one of a plurality of optical reduction or magnification ratios in response to the positioning of the main lens assembly along the optical path and/or the presence or absence of an additional, supplemental corrective lens.

Most copy machines in commercial use today are constructed so that a supplemental corrective lens element is automatically added to the optical system when the main lens assembly is at the proper positioning, changing the properties of the lens system. The mechanism for moving the main lens assembly along the optical path comprises a feed screw rod rotated by means of a motor and a nut means, on which the main lens assembly is fixedly mounted, engaged with the feed screw rod. In the apparatus described above it sometimes happens that, owing to the inertia of the driving motor, or positioning errors of position-detecting switches, or the like, the driving motor rotates excessively and then the main lens assembly overruns the position in which it should be stopped. As a result, the optical lens system creates a distorted reproduction of the original. In order to minimize the departure of the main lens assembly from the position in which it is to be stopped, it is known to use a feed screw rod of small pitch, because the smaller the pitch of the feed screw rod, the less the deviation that occurs. However, in such apparatus, it is necessary to force the screw rod to rotate a large number of rotations in order that the main lens assembly will be moved a given distance along the optical path. Consequently a long time will be required to change the magnification or reduction ratio.

OBJECTS OF THE INVENTION

Accordingly, it is an object of the present invention to provide an optical apparatus for locating a main lens assembly at the position where copies of originals at a selected magnification or reduction ratio can be created.

It is another object of the present invention to provide an optical apparatus which can move a main lens assembly quickly along the optical path.

It is still another object of the present invention to provide an optical apparatus which is adapted to move a supplemental corrective lens element without interference with another supplemental corrective lens element as either of two supplemental corrective lens elements is alternatively added to the optical train of the optical lens system.

These and other objects of the instant invention are attained by the present invention by using a cam cylinder formed on its outer surface with a spiral camming groove which is engaged by a follower pin fixedly attached to a main lens carriage so that the main lens carriage is moved a long distance with only a small amount of revolution of the cam cylinder and further by using a main lens support frame holding a main lens assembly slidably mounted for movement by the cam cylinder along the optical path with the guidance of a cam lever so that the deviation of the main lens carriage from the position in which it is to be located can be compensated by the shift of the main lens support frame.

In the preferred embodiment of the present invention, the cam cylinder is formed with a part-circular camming groove extending circumferentially in which the main lens carriage is stopped so that the main lens assembly can be located in a proper position even though the driving motor overruns while the follower pin is still in the part-circular groove. Furthermore, the camming groove is open at its opposite ends so that the follower pin leaves the groove without damage due to collision with an end of the groove.

Also in the preferred embodiment of the present invention, the main lens carriage is adapted to move entirely the total traverse during two revolutions of the cam cylinder. Accordingly, a cam means, which is forced to rotate by the cam cylinder and move by a screw rod engaged therewith, causes position-detecting switches provided along the screw rod to turn on or off so as to stop the driving motor and then locate the main lens carriage in proper position.

Further in the preferred embodiment of the present invention, a cam plate movable with a main lens assembly is provided with a first camming means causing a first supplemental corrective lens element to leave the optical path and a second camming means extending adjacent to the first camming means causing the first supplemental corrective lens element to move back into the optical path so that the first supplemental corrective lens element is moved out of a path of interference with a second supplemental corrective lens element when the second supplemental corrective lens element is moved into the optical path.

DESCRIPTION OF DRAWINGS

For a fuller understanding of the nature and objects of the invention, reference should be had to the following detailed description and the accompanying drawings of one embodiment of the invention, in which.

DESCRIPTION OF THE PREFERRED EMBODIMENT

Figure 1:
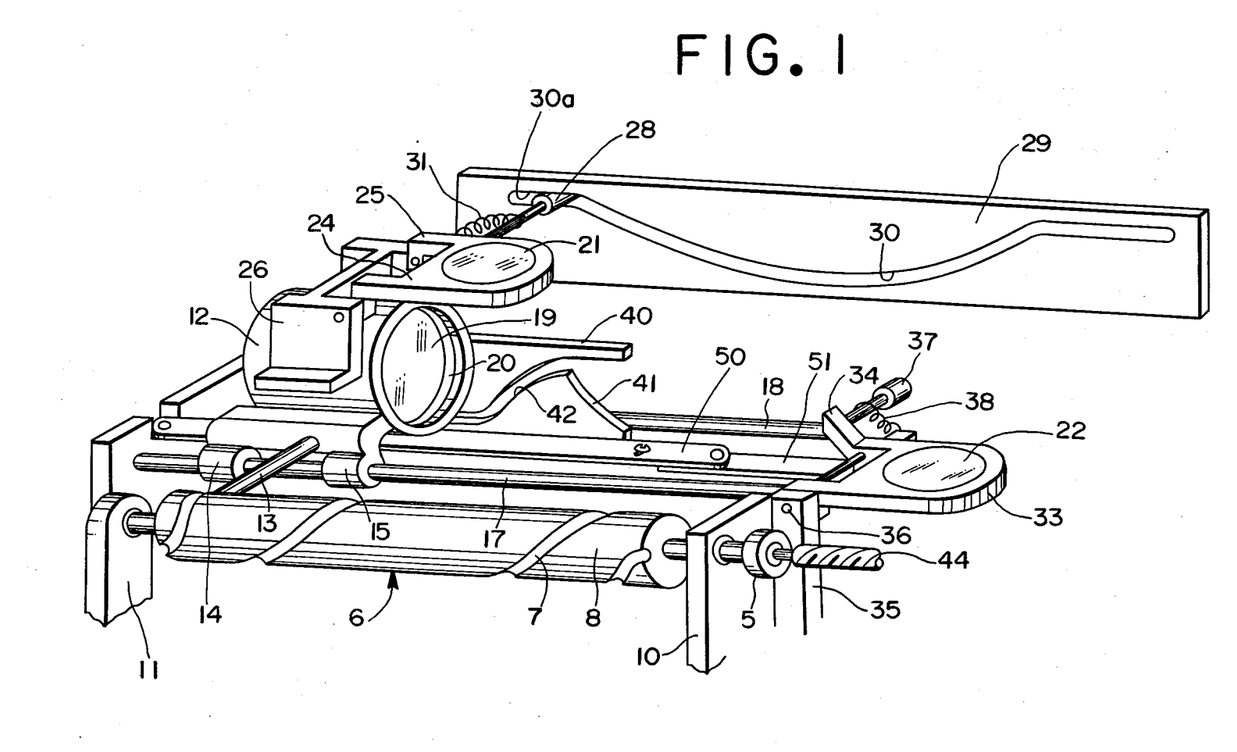
FIG. 1 is a perspective view of an apparatus for changing magnification or reduction ratios of an optical system according to the invention.
Figure 2:
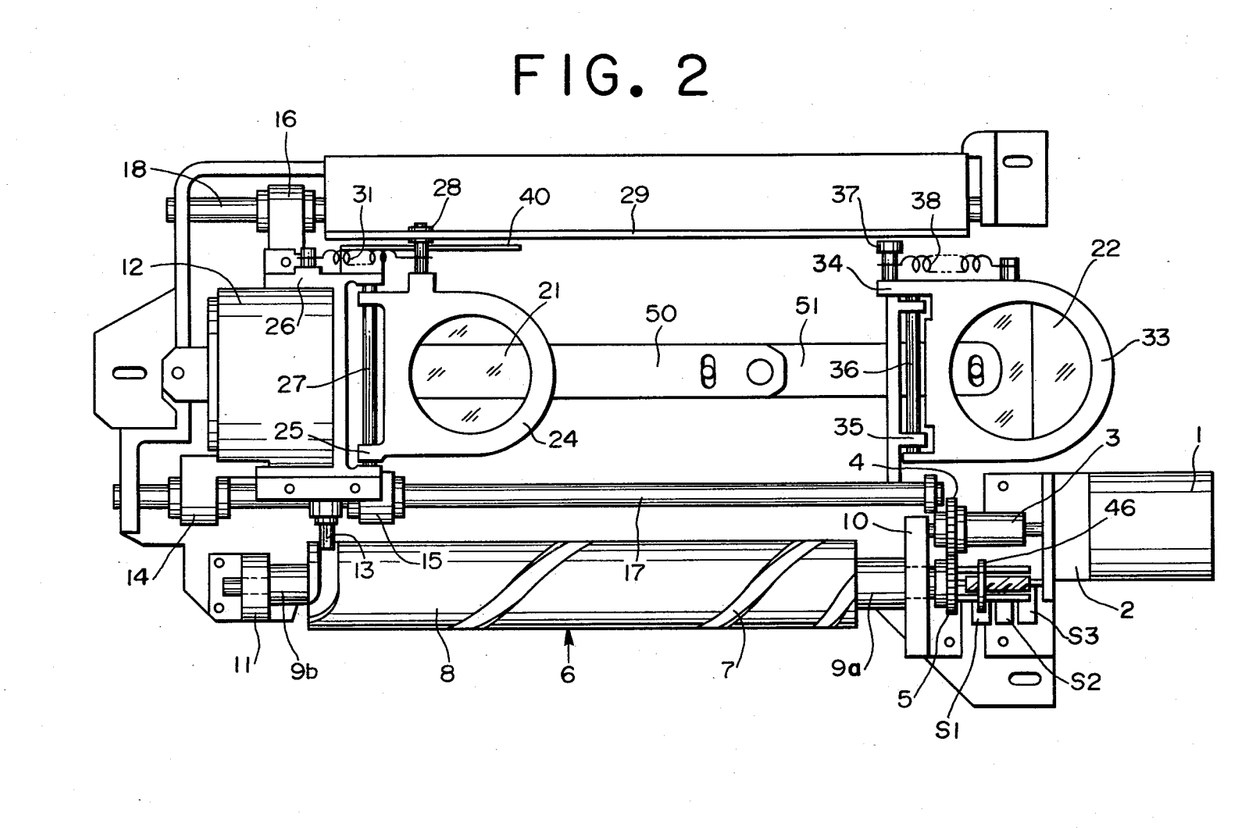
FIG. 2 is a plan view of the apparatus shown in FIG. 1.

With reference to FIGS. 1 and 2, in the optical system of copy machines or the like, which can be conventional apart from the illustrated structure, a rotary shaft 3 is rotated by a driving motor 1 at reduced speed through a reduction gear means 2, thus rotating a gear 5 engaged by a driving gear 4 which is fixedly attached to the rotary shaft 3. Gear 5 rotates a cam cylinder 6. The cam cylinder 6 comprises a cylindrical portion 8 on which a camming groove 7 is formed and shaft portions 9a and 9b provided on opposite ends of the cylindrical portion 8. The shaft portion 9a, to the end of which the gear 5 is fixedly attached, is journalled by a bearing provided on a support bracket 10. The other portion 9b is journalled by a bearing 11.

The cylindrical portion 8 has a circumferentially helical camming groove 7 formed on its outer surface in which a follower pin 13 projecting from a main lens carriage 12 engages. The main lens carriage 12 is provided with three legs 14, 15 and 16, two of them being slidably mounted on a guide rod 17 and the other on another guide rod 18. Consequently, when the cam cylinder 6 is caused to rotate by the driving motor 1, the main lens carriage 12 is moved on guide rods along the optical path.

Slidably mounted on the main lens carriage 12 is a main lens support frame 20 holding a main lens assembly 19 which is used to create copies of originals of the same size as the original. When the main lens carriage 12 is positioned at the extreme left end in FIG. 1, the same size copies (1:1 reproduction ratio) as the original can be created. And when the main lens carriage 12 is moved along the optical path and positioned at the middle and then a supplemental corrective lens element 21 is added to the optical lens system to cooperate with the main lens assembly for changing the properties of the lens system, a 30 percent reduction can be attained. Further when the main lens carriage 12 is moved to the extreme right end and a different supplemental corrective lens element 22 is added to the optical path to cooperate with the main lens assembly instead of the supplemental corrective lens element 21, a 50 percent optical reduction may be attained. The described embodiment has been constructed to attain two exemplary reduction rates. These particular reductions are selected by way of illustration only and it is to be understood that any number of reductions or any specific optical reduction ratio could be employed including negative reductions, i.e., enlargements.

The supplemental corrective lens element 21 is mounted on a support frame 24 with arms 25 swingably pivoted on a bracket 26 of the main lens carriage 12 by means of axle 27.

The support frame 24 has a cam follower pin 28 projecting laterally therefrom which is engaged with a camming groove 30 formed on a cam plate 29. Between the cam follower pin 28 and the bracket 26 a spring 31 is provided to urge the support frame 24 in its raised position. When, for example, the main lens carriage 12 is moved from its extreme left position (shown in FIG. 1) to the right along the guide rods 17 and 18, the cam follower pin 28 will begin its motion along a downwardly sloping portion of the camming groove 30 so as to pivot the support frame 24 downward into the optical path. In doing so, the support frame 24 is moved against the tension of the spring 31. If further movement of the main lens carriage 12 is carried out in the same direction, the cam follower pin 28 will begin to ascend the upwardly sloping portion of the camming groove 30 to return the support frame 24 to its raised position.

The supplemental corrective lens element 22 is mounted in a support frame 33 on opposite sides of which arms 34 are provided which are swingably pivoted on a support bracket 35 by means of shaft 36. On the free end of one arm 34 extending obliquely upwardly in the raised FIG. 1 position, a cam follower pin 37 projects laterally and is urged upward by a spring 38.

A cam plate 40 is attached to the main lens carriage 12 for pivoting supplemental corrective lens element support frame 33 into the optical path from its initial or horizontal position, in which it is out of the optical path, or for pivoting it in the reverse direction. Cam plate 40 is formed with two camming portions, the one of which is a surface camming portion 41 and the other of which is a camming groove 42. When the main lens carriage 12 is moved toward the right in FIG. 1, the cam follower pin 37 will begin to ascend the sloping portion of the surface camming portion 41 so that, if the support frame 33 is in the optical path, frame 33 will be moved out of the optical path prior to the pivoting of the support frame 24 out of the optical path. Thus, when the support frame 24 pivots, the support frame 33 is prevented from interfering. The camming groove 42 serves to cause the pivotal movement of the support frame 33 into or out of the optical path.

Figure 4:
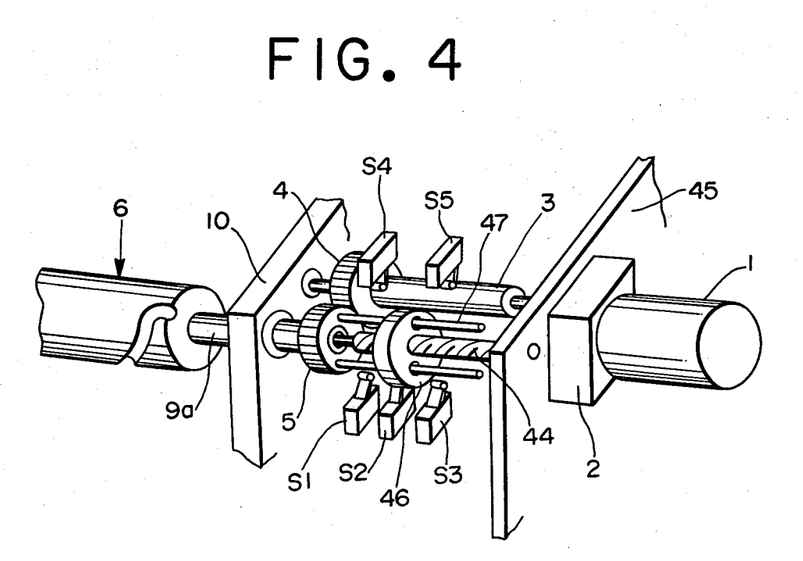
FIG. 4 is a fragmentary perspective view showing an arrangement for detecting positions of a cam cylinder.
Figure 5:
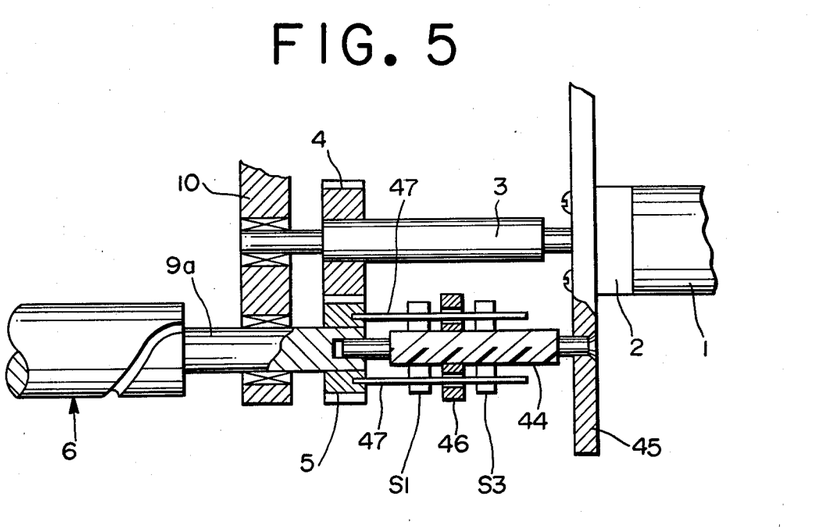
FIG. 5 is a partial cross-sectional view of FIG. 4.

Referring now particularly to FIGS. 4 and 5, there is shown an arrangement for detecting positions of the main lens carriage 12. A screw-threaded rod 44, one end of which is fixedly secured to a plate 45 having driving motor 1 and reduction gear means 2 attached thereto and the other end of which is slidably received in the shaft portion 9a of the cam cylinder 6, is engaged by a cam 46 through which a pair of connecting pins 47 provided on gear 5 penetrate. Owing to the connection of the cam disc 46 with the gear 5 through pins 47, rotational movement of the gear 5 causes the cam disc 46 to be rotated and thus moved along the screw rod 44.

The main lens carriage 12 is adapted to be moved from one extreme end of its range of movement to the other end by two revolutions of the cam cylinder. Consequently, the cam 46 is caused to make two revolutions. Microswitches $S_1$, $S_2$, $S_3$ for detecting the position where the main lens carriage 12 is to be stopped are respectively turned on in the order shown in FIG. 4 when the cam 46 is progressively moved by its rotation along the screw rod 44. The positions of microswitches $S_1$, $S_2$ and $S_3$ correspond to the magnification ratios, e.g., 100 percent, 70 percent and 50 percent, respectively.

In the event that microswitches $S_1$, $S_2$ or $S_3$ may be accidentally inoperative, there are further provided microswitches $S_4$ and $S_5$ for back-up. The microswitch $S_4$ is turned off to deenergize the driving motor 1 with a half rotation of the cam 46 beyond the location of the microswitch $S_1$. The microswitch $S_5$ is also turned off to deenergize the driving motor 1 with a half rotation of the cam 46 beyond the location of the microswitch $S_3$ where the reduction rate of 50 percent will be attained.

Figure 6:
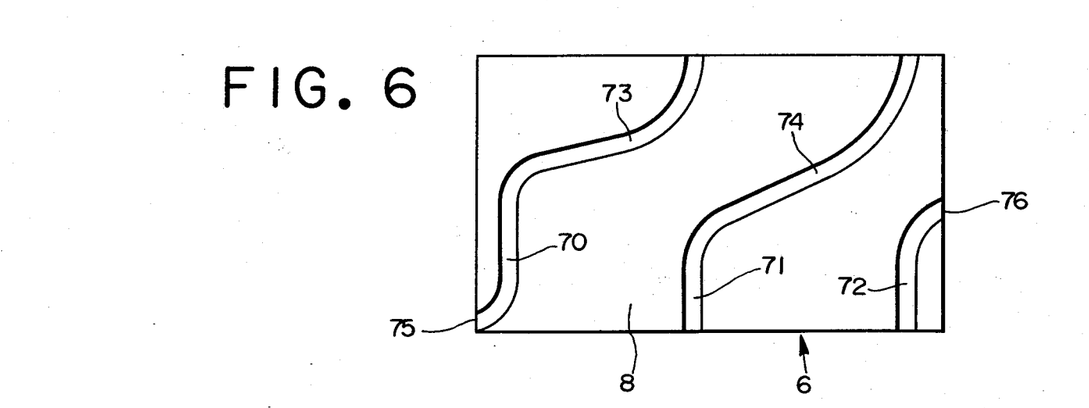
FIG. 6 is a flat projection of a cam cylinder.

The camming groove 7, as shown clearly in FIG. 6, comprises straight portions 70, 71 and 72 as shown in the flat projection of FIG. 6, which of course are actually part-circular portions disposed peripherally of cylinder 6. When pin 13 rides in these straight portions, then the main lens carriage 12 will be held stationary. As the cam cylinder 6 continues to rotate, pin 13 reaches curved portions 73 and 74 each of which is connected with the adjacent straight portions at opposite ends, the straight portions 70 and 72 being connected with end openings 75 and 76, respectively. The straight portions are positioned at fixed positions corresponding to those where the main lens assembly can create copies of originals at magnification ratios of 100 percent, 70 percent with the supplemental corrective lens element 21, and 50 percent with the supplemental corrective lens element 22, respectively. Each straight portion 70 to 72 is formed to extend around one third of the circumference of the cam cylinder 6 so that the main lens carriage 12, i.e., the main lens assembly, can be stopped in fixed position along the optical path even though the driving motor 1 will slightly overrun as a result of its inertia.

In case the main lens carriage 12 should be slightly displaced from the proper position where it is to be stopped because of inertia of the driving motor 1, or the play of the camming groove, or the like, the image produced by the lens system will be out of focus. In order to avoid this problem, there is provided a position correcting mechanism comprising two cam levers 50 and 51 for shifting the main lens support frame 20 along the optical path so as to correct such a deviation.

Figure 7:
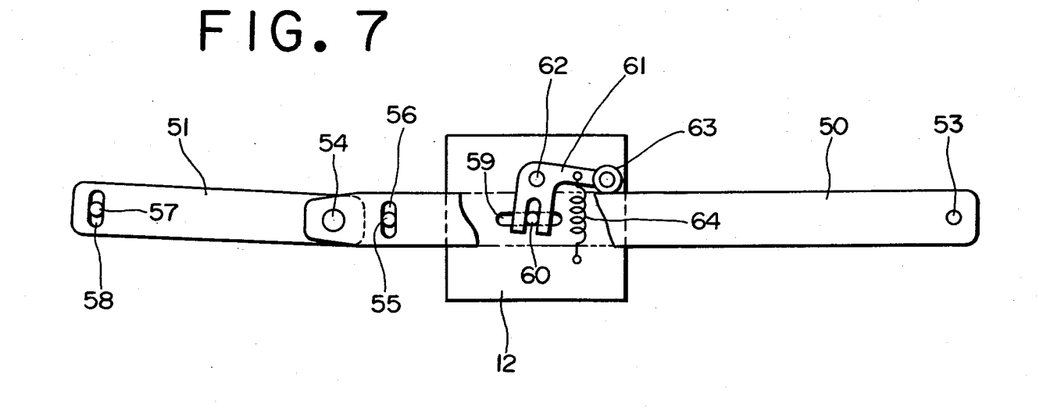
FIG. 7 is a detailed bottom plan view showing a correcting mechanism for the position of the main lens carriage.

The cam lever 50, one end of which is pivotally mounted on the stationary frame by an axle 53 and the other connected to the cam lever 51 by means of an axle 54, is formed with a slot 56 engaged by a fixed guide pin 55 so that the cam lever 50 can swingably move, adjusting its angle. The other end portion of the cam lever 51 is also formed with a slot 58 engaged by a fixed pin 57 in order to permit adjusting its angle.

A pin 60 on the main lens support frame 20 projects through a longitudinal slot 59 in the lens carriage 12 and is engaged by a forked end of follower lever 61 swingably mounted on an axle 62 on carriage 12. On the end opposed to the forked end of the follower lever 61, a roller 63 is provided and urged by spring 64 so as to abut and roll on the edges of cam levers 50 and 51.

Figure 8:
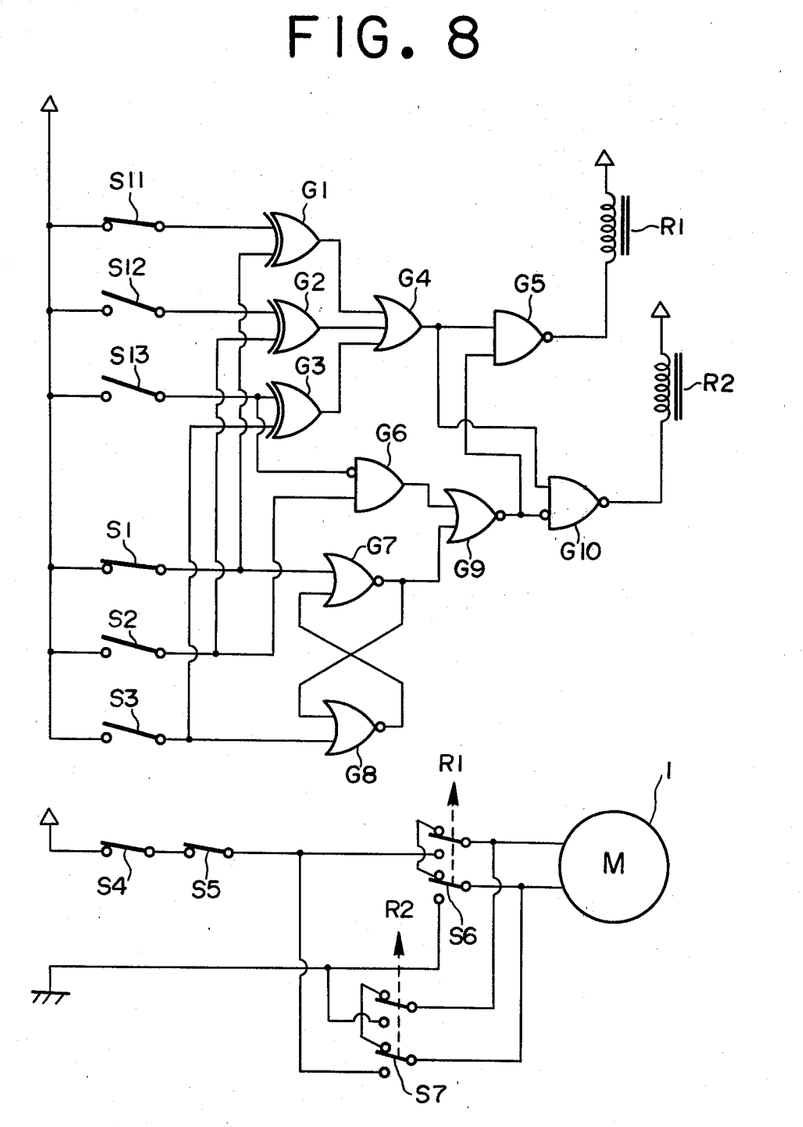
FIG. 8 is a circuit diagram showing the control of the drive motor.

Referring now to FIG. 8 showing the motor control circuit, there are shown microswitches $S_1$, $S_2$ and $S_3$ for detecting the positions of the main lens carriage 12 and switches $S_{11}$, $S_{12}$ and $S_{13}$ for selecting the magnification or reduction ratios at which copies of originals are created, connected to a power supply of high voltage.

The microswitch $S_1$ for detecting position and the switch $S_{11}$ for selecting the magnification ratio, each corresponding to 100 percent magnification, are connected to two input terminals of an exclusive OR gate $G_1$, respectively. The microswitch $S_2$ and the switch $S_{12}$, each corresponding to the 70 percent magnification ratio, are connected in the same manner to an exclusive OR gate $G_2$, and the microswitch $S_3$ and the switch $S_{13}$, each corresponding to the 50 percent ratio, to an exclusive OR gate $G_3$.

The output terminal of a NOR gate $G_4$ being connected by exclusive OR gates $G_1$, $G_2$ and $G_3$ to its input terminals is connected to one of input terminals of a NAND gate $G_5$. Connected to the output terminal of the NAND gate $G_5$ is one end of a relay $R_1$ whose other end is connected to the power supply. The relay $R_1$, when energized, causes a double contact switch $S_6$ to turn on, actuating the driving motor 1 to rotate and thus to move the main lens carriage 12. When the driving motor is energized in the normal direction, the main lens carriage 12 is moved along the optical path toward the position where 100 percent magnification ratio is attained.

The switch $S_{13}$ for selecting the 100 percent magnification ratio and the microswitch $S_2$ for detecting the position of the main lens carriage 12 where the 70 percent magnification ratio can be attained are connected to input terminals of the NAND gate $G_6$. The microswitch $S_1$ for detecting the position of the main lens carriage 12 where the 100 percent magnification ratio can be attained and the microswitch $S_3$ for detecting the 50 percent position are also connected to NOR gates $G_7$ and $G_8$, respectively. NOR gates $G_7$ and $G_8$ comprise a flip-flop so that the flip-flop, when the microswitch $S_1$ for detecting the 100 percent position is turned on, is set to cause the output terminal or "Q" terminal of the NOR gate to become high in potential and on the other hand the flip-flop is reset when the microswitch $S_3$ for detecting the 50 percent position is turned on.

The output terminal of a NOR gate $G_9$, to which the output terminal of the AND gate $G_6$ and the "Q" terminal of the flip-flop are connected respectively, is connected to the input terminals of NAND gates $G_5$ and $G_{10}$. Connected to NAND gate $G_{10}$ is the output terminal of OR gate $G_4$ and a relay $R_2$ with its other end connected to the high voltage power source. Consequently, the relay $R_2$, when energized, causes a double switch $S_7$ to turn on, actuating the driving motor 1 to rotate in the reverse direction so as to move the main lens carriage 12 toward the 50 percent position.

The driving motor 1 is controlled by an output signal from the OR gate $G_4$ in its operation and by output signals from the NOR gate $G_9$ in its direction of rotation. When microswitches $S_1$ to $S_3$ for detecting the position of the main lens carriage 12 and switches $S_{11}$ to $S_{13}$ for selecting the magnification or reduction ratio are in the same state, the driving motor 1 is deenergized, stopping its rotational operation. The conditions of the driving motor control circuit and the rotational state of the driving motor 1 are tabulated in Table 1.

TABLE 1

|  | S11 | S12 | S13 | S1 | S2 | S3 | G1 | G2 | G3 | G4 | G6 | G7 | G9 | G5 | G10 | MOTOR | R1 | R2 |
|---|---|---|---|---|---|---|---|---|---|---|---|---|---|---|---|---|---|---|
|  |  |  |  | 1 | 0 | 0 | 0 | 0 | 0 | 0 | 0 | 1 | 1 | 1 | 1 | STOP | OFF | OFF |
| 100 percent | 1 | 0 | 0 | 0 | 1 | 0 | 1 | 1 | 0 | 1 | 1 | 0 | 0 | 1 | 0 | REVERSE | OFF | ON |
|  |  |  |  | 0 | 0 | 1 | 1 | 0 | 1 | 1 | 0 | 1 | 0 | 1 | 0 | REVERSE | OFF | ON |
|  |  |  |  | 1 | 0 | 0 | 1 | 1 | 0 | 1 | 0 | 0 | 1 | 0 | 1 | NORMAL | ON | OFF |
| 70 percent | 0 | 1 | 0 | 0 | 1 | 0 | 0 | 0 | 0 | 0 | 1 | 0 | 0 | 1 | 1 | STOP | OFF | OFF |
|  |  |  |  | 0 | 0 | 1 | 0 | 1 | 1 | 1 | 0 | 1 | 0 | 1 | 0 | REVERSE | OFF | ON |
|  |  |  |  | 1 | 0 | 0 | 1 | 0 | 1 | 1 | 0 | 0 | 1 | 0 | 1 | NORMAL | ON | OFF |
| 50 percent | 0 | 0 | 1 | 0 | 1 | 0 | 0 | 1 | 1 | 1 | 0 | 0 | 1 | 0 | 1 | NORMAL | ON | OFF |
|  |  |  |  | 0 | 0 | 1 | 0 | 0 | 0 | 0 | 0 | 1 | 0 | 1 | 1 | STOP | OFF | OFF |

Figure 9:
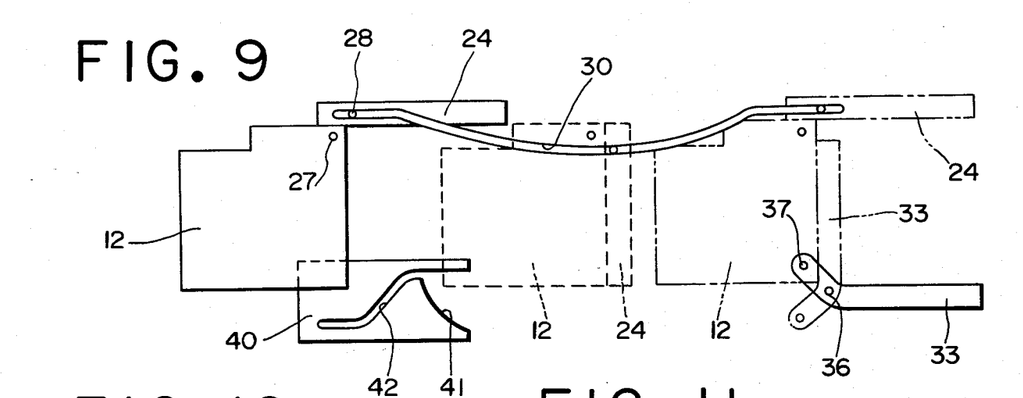
FIGS. 9 to 11 are diagrammatic side views showing various operative positions of a main lens carriage and a supplemental corrective lens element support frame according to the invention.
Figure 10:
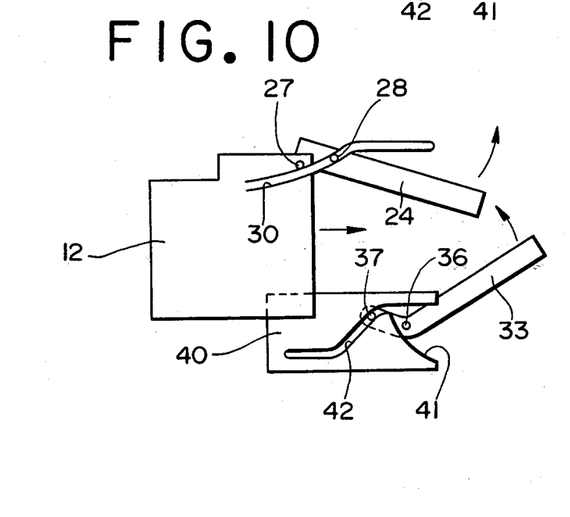
Figure 11:
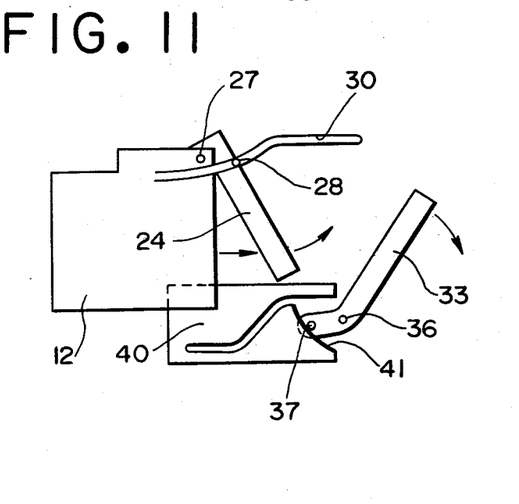

The operation of a preferred embodiment of the invention will be understood from the following description in connection with FIGS. 9 to 11.

As shown in FIG. 9, when the follower pin 13 is in the straight portion 70 of the camming groove 7, the main carriage 12 is held at the 100 percent position. At this time, as shown in Table 1, the driving motor is stopped because of the turning on of the microswitch $S_1$ for detecting the 100 percent position and the switch for selecting the 100 percent magnification ratio.

Then the main lens carriage 12 with the supplemental corrective lenses out of the optical path is at the 100 percent position. Between an original and a photosensitive surface, a latent image the same as the original in size is produced on the photosensitive surface. When the switch $S_{12}$ for selecting the 70 percent ratio is turned on, the relay $R_2$ is energized as shown in Table 1. As a result of the operation described above, the double contact switch $S_7$ will be turned on, actuating the motor 1 to rotate in a reverse direction and rotating the cam cylinder 6 through the reduction gear 2, the driving gear 4 and the gear 5. The rotation of the cam cylinder 6 causes the main lens carriage to move to the left, by the follower pin 13 engaging with the camming groove 7. Also, the rotation of the cam cylinder 6 causes the cam 46 to move to the left (as seen in FIGS. 4 and 5) since cam 46 is rotated by a pair of connecting pins 47 fixedly attached to the gear 5. The further movement of the cam 46 turns the 100-percent-position-detecting microswitch $S_1$ off immediately before the follower pin 13 comes out of the straight portion 70 of the camming groove 7, when the 70-percent-position-detecting microswitch $S_2$ is turned on and then the relay $R_2$ is deenergized, whereupon the driving motor 1 is stopped.

Because of the stopping of the driving motor 1, the main lens carriage 12 rests in the 70 percent position as shown by the dotted line in FIG. 9. At the time when the main lens carriage 12 is moved to the 70 percent position from 100 percent position, the supplemental corrective support frame 24 is pivotally and gradually lowered and finally inserted into the optical train. In this situation, the main lens assembly cooperates with the supplemental corrective lens element 21 to create copies of originals at the 70 percent magnification ratio.

In case copies of originals are to be created at the 50 percent ratio, the switch $S_{13}$ for selecting the 50 percent ratio is pushed to cause the driving motor 1 to rotate in a reverse direction, then rotating the cam cylinder 6 fully once. One revolution of the cam cylinder 6 causes the cam 46 to rotate and move along the screw rod 44. Therefore the microswitch $S_3$ for detecting the 50 percent position will be turned on by the cam 46 and then causes the driving motor 1 to stop as the double contacts switch $S_7$ is turned off owing to the deenergization of the relay $R_2$.

At the time of completion of one more rotation of the cam cylinder 6, the main lens carriage 12 has reached the 50 percent position as shown by the dash-dotted line in FIG. 9. As the main lens carriage 12 is brought close to the 50 percent position, the supplemental correcting lens element support frame 33 is gradually moved into the optical path by the engagement of the follower pin 37 with the camming groove 42, while the supplemental corrective lens element support frame 24 is again moved out of the optical path. As shown in FIGS. 10 and 11, support frame 24 does not interfere with support frame 33. If the support frame 33 is upstanding in the optical path, the support frame 33 is first swung down by the engagement of the follower pin 37 with the camming surface 41 swung gradually back up into the optical path by the engagement of the pin 37 with the camming groove 42. In this position, copies of originals at the 50 percent ratio can be created by the main lens assembly 19 in conjunction with the supplemental corrective lens element 22. In order to change the ratio to 50 percent from 100 percent, the 50 percent selecting switch is pushed.

Under the conditions described above, although the microswitch for detecting the 70 percent position is turned on by the main lens carriage 12, the driving motor continues to rotate in reverse as will be understood from Table 1. The driving motor 1 is stopped only when the microswitch $S_3$ is turned on by the main lens carriage 12. During the rotation of driving motor 1 the cam cylinder 6 is caused to rotate two full revolutions, moving the main lens carriage 12 from the 100 percent position (in solid line) to the 50 percent position (in the dash-dotted line) as shown in FIG. 9.

In order to change the ratio from 50 percent to 70 percent or 100 percent, it suffices to turn the 70 percent selecting switch $S_{12}$ or the 100 percent selecting switch $S_{13}$ on, respectively, to energize the relay $R_1$. As a result of this, the double contact switch $S_6$ is turned on, actuating the driving motor 1 to rotate in the normal direction so that the main lens carriage 12 is moved in the opposite direction to the 100 percent position.

It sometimes happens that the driving motor 1 rotates a bit too far due to the inertia thereof when the power supply is cut because it is not forced to stop rapidly by means of a brake. Consequently, there are cases where the main lens carriage 12 is stopped at a position slightly different from the desired position. In this case, the deviation will be corrected by the two cam levers 50 and 51 adjusted as to angle. The follower lever 61 is pivoted about the axle 62 so as to move the pin 60 on the main lens support frame 20 along the slot 59. Thus the main lens support frame 20 is moved relative to the main lens carriage 12 so that the deviation of the main lens carriage 12 from the power position is compensated. It is of course to be understood that the angular positions of levers 50 and 51 are adjusted in advance so that movement of roller 63 therealong will cause only just the right amount of movement of lens support frame 20 relative to lens carriage 12, to compensate for overrunning of the intended position by lens carriage 12.

Figure 3:
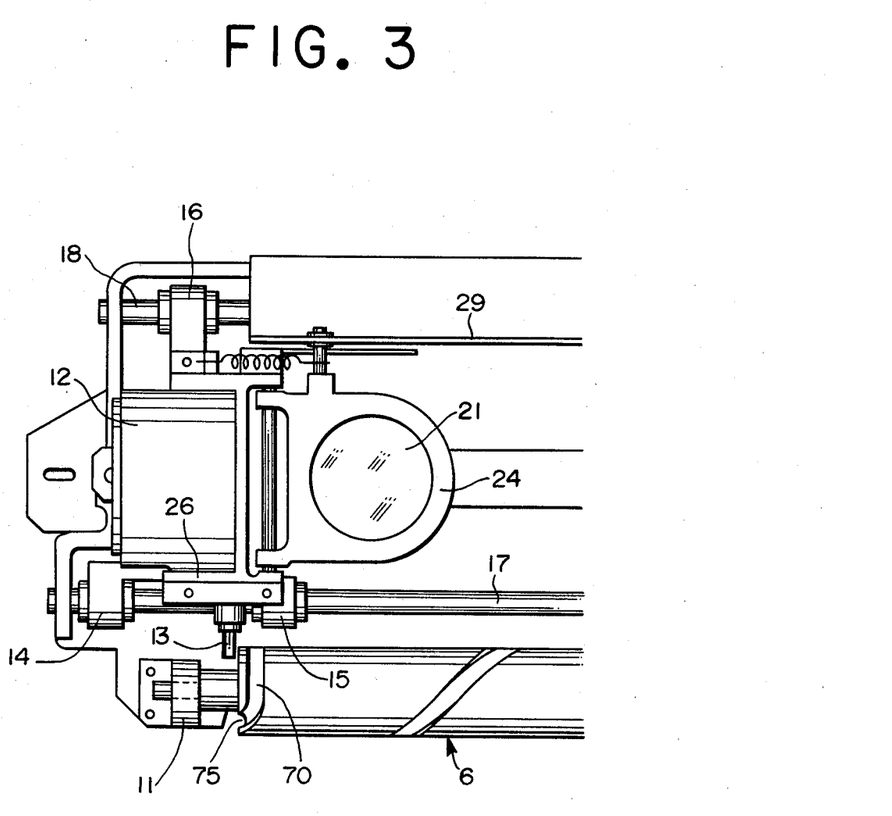
FIG. 3 is a fragmentary plan view showing a cam cylinder and a main lens carriage disengaged from each other.

In the event of microswitches $S_1$ and $S_3$ for selecting magnification or reduction rates being out of operation, the driving motor 1 is not stopped and this causes the main lens carriage 12 to move beyond the 100 percent or 50 percent position. The camming groove 7 is provided with openings 75 and 76 at opposite ends thereof so that the follower pin 13 leaves the camming groove 7, as shown in FIG. 3, without damage due to the striking of the pin against what would otherwise be a closed end of the camming groove.

Furthermore, one of safety microswitches $S_4$ and $S_5$ is turned off to stop the driving motor 1 when the cam cylinder 6 is rotated through an angle of 180° beyond the 50 percent or 100 percent position. Therefore, the driving motor 1 cannot continue to rotate with the disengagement of the follower pin 13 from the camming groove.

As many different embodiments of this invention may be made without departing from the spirit and scope thereof, it is to be understood that the invention is not limited to the specific embodiments thereof except as defined in the appended claims.

What is claimed is:

1. In an optical apparatus for changing magnification and/or reduction ratios at which copies of originals are produced, comprising a main lens assembly movable along an optical path and first and second supplemental correcting lens elements adapted alternatively to move into the optical path and to cooperate with said main lens assembly at fixed positions; the improvement comprising:
- a main lens support frame holding said main lens assembly;
- a main lens carriage in which said main lens support frame is slidably mounted;
- supporting means for supporting said main lens carriage for movement along the optical path;
- a driving motor for moving said main lens carriage along the optical path;
- motor control means for deenergizing said driving motor when said main lens carriage reaches a predetermined position;
- a first support frame for holding said first supplemental correcting lens element;
- a second support frame for holding said second supplemental correcting lens element and attached to said main lens carriage;
- a first cam plate fixedly attached to said main lens carriage so as to move therewith and having a camming groove which causes said first support frame to move into and out of the optical path; and
- a second cam plate extending along the moving direction of said main lens carriage and having a camming groove which causes said second support frame to move into and out of the optical path.

2. An optical apparatus as defined in claim 1, said apparatus further comprising compensating means for correcting the position of said main lens assembly by shifting said support frame relative to said main lens carriage along the optical path when said main lens carriage stops in a position other than said predetermined position.

3. An optical apparatus as defined in claim 1, said first cam plate further comprising a camming surface which, at the time when said main lens carriage is brought close to said first support frame, causes said first support frame, when disposed in the optical path, to move out of the optical path.

4. An optical apparatus as defined in claim 1, and a cam cylinder parallel to said supporting means and having a camming groove on its outer surface, a follower pin with one end thereof attached to said main lens carriage and the other end thereof engaged in said camming groove, said driving motor rotating said cam cylinder to move said main lens carriage along the optical path.

5. An optical apparatus as defined in claim 4, wherein said cam cylinder is formed with a part-circular camming groove extending about the cylinder at the position where said main lens carriage is to be stopped.

6. An optical apparatus as claimed in claim 4, wherein opposed ends of said camming groove are open so that said follower pin can disengage from said camming groove when said main lens carriage moves excessively beyond an extreme end position.

7. An apparatus as defined in claim 4, wherein the end portions of said camming groove are part circular and terminate at each end of the cylinder in groove ends which are open to permit the disengagement of said follower pin from said camming groove.

8. An optical apparatus as defined in claim 4, wherein said camming groove comprises three part-circular camming portions formed at extreme end portions and an intermediate portion of the groove and two helical camming portions each of which is formed between two of said part-circular camming portions, thereby to define three rest positions of said main lens carriage.

9. An optical apparatus as defined in claim 4, wherein said motor control means comprises a cam plate that rotates with said cam cylinder, a fixed screw-threaded rod screw-threadedly engaged by said cam plate, first switch means for detecting positions of said main lens carriage and actuated by said cam plate, second switch means for selecting one of a plurality of optical ratios at which copies of originals are created, a logic circuit for selectively actuating a first or second relay which energizes said driving motor in forward or reverse depending on the states of said first switch means that are actuated and said second switch means that are selected and deactuating said relay in operation when said first switch means corresponding to said second switch means selected is actuated, a first relay switch for allowing said driving motor to be energized in forward as said first relay for forward energization is actuated, and a second relay switch for allowing said driving motor to be energized in reverse as said second relay for reverse energization is actuated.

10. An optical apparatus as defined in claim 2, wherein said compensating means comprises cam means extending longitudinally along the direction of movement of said main lens carriage, a follower lever swingably mounted on said main lens carriage and having an end riding on said cam means, a pin fixedly attached to said main lens support frame with its free end engaged with said follower lever, and a slot formed on said main lens carriage for allowing the last-named pin to move therein.

11. An optical apparatus as defined in claim 10, wherein said cam means is an elongated plate number angularly adjustable relative to the optical axis of said main lens assembly.

* * * * *